United States Patent [19]

Edwards et al.

[11] Patent Number: 4,861,120
[45] Date of Patent: Aug. 29, 1989

[54] MODULAR ENDLESS TRACK DRIVE SYSTEM AND METHODS OF MAKING, INSTALLING AND REPAIRING SAME

[75] Inventors: John W. Edwards, Brandon; Daniel R. Harper; Quinton B. McNew, both of Ft. Myers, all of Fla.

[73] Assignee: Edwards, Harper, McNew & Company, Fort Myers, Fla.

[21] Appl. No.: 49,819

[22] Filed: May 14, 1987

[51] Int. Cl.⁴ ............................................. B62D 55/20
[52] U.S. Cl. .................... 305/35 R; 305/39; 305/40; 474/240; 474/242
[58] Field of Search ............... 305/12, 35 R, 35 EB, 305/37, 38, 39, 40, 41, 46, 51, 54, 55, 57; 474/201, 237, 240, 242, 205

[56] References Cited

U.S. PATENT DOCUMENTS

| | | |
|---|---|---|
| 296,998 | 4/1884 | Page . |
| 394,335 | 12/1888 | Chase . |
| 893,787 | 7/1908 | Conklin . |
| 905,405 | 12/1908 | Britton . |
| 1,217,007 | 2/1917 | Jory . |
| 1,400,100 | 12/1921 | Reddaway . |
| 1,420,531 | 6/1922 | Dutkiewicz et al. . |
| 1,693,833 | 12/1928 | Worley . |
| 1,789,084 | 1/1931 | Schwarz . |
| 1,814,046 | 7/1931 | Kegresse . |
| 1,862,784 | 6/1932 | Choate . |
| 1,895,241 | 1/1933 | Worley ........................ 305/38 X |
| 1,898,035 | 2/1933 | Diamond . |
| 1,911,184 | 5/1933 | Flynn . |
| 1,973,214 | 9/1934 | Lamb . |
| 1,975,726 | 10/1934 | Martinage . |
| 2,025,007 | 12/1935 | Wendling . |
| 2,037,983 | 4/1936 | Johnston . |
| 2,116,834 | 5/1938 | Kegresse . |
| 2,290,109 | 7/1942 | Mayne . |
| 2,309,648 | 2/1943 | Kelly . |
| 2,322,466 | 6/1943 | Perry . |
| 2,326,719 | 8/1943 | Myers ........................... 305/58 |
| 2,338,817 | 1/1944 | Mayne . |
| 2,342,953 | 2/1944 | Mayne . |
| 2,345,763 | 4/1944 | Mayne . |
| 2,350,076 | 5/1944 | Smith et al. . |
| 2,374,240 | 4/1945 | Shankman . |
| 2,376,802 | 5/1945 | Morse . |
| 2,387,802 | 10/1945 | Mayne . |
| 2,410,507 | 11/1946 | Knight ........................... 305/37 |
| 2,412,122 | 12/1946 | Campbell . |

(List continued on next page.)

FOREIGN PATENT DOCUMENTS 922346  3/1973  Canada .
948243  5/1974  Canada .

(List continued on next page.)

OTHER PUBLICATIONS

Caterpillar (undated), "CAT CHALLENGER 65 The Total Field Machine", 12 pages.

(List continued on next page.)

Primary Examiner—Russell D. Stormer
Attorney, Agent, or Firm—Oliff & Berridge

[57] ABSTRACT

A modular endless track drive system for use on a track vehicle such as a bulldozer is made up of a number of polymeric drive modules interconnected with polymeric master links. Each drive module includes a plurality of drive members with lateral frictional drive faces for engagement with a drive wheel, each master link having similarly configured drive faces. The drive wheel is provided with drive surfaces shaped to match the shape of the lateral drive faces on the drive modules and master links and/or a sprocket for engaging with additional drive faces on the drive modules and master links. A drive module is made by molding a polymeric multiple drive member structure atop a plurality of base portions, encasing one or more connecting members therein with their ends exposed. The master links are made in a similar fashion, but with upper and lower base portion parts for fastening the drive module connector members therebetween to form an endless track. The system is readily installed by assembling the necessary drive modules and all but one of the master links to form a track with two disconnected ends, laying the assembled track linearly across the ground, positioning a track vehicle thereover, looping the track over the wheels of the track vehicle, and installing the final master link to form the endless track. Repairs to the system are made by simply removing and replacing broken drive modules and master links in situ.

55 Claims, 6 Drawing Sheets

U.S. PATENT DOCUMENTS

| | | |
|---|---|---|
| 2,449,421 | 9/1948 | Slemmons et al. . |
| 2,476,460 | 7/1949 | Smith . |
| 2,476,828 | 7/1949 | Skromme . |
| 2,487,813 | 11/1949 | Knox . |
| 2,531,111 | 11/1950 | Daniels . |
| 2,537,745 | 1/1951 | Daniels . |
| 2,541,177 | 2/1951 | Slemmons . |
| 2,592,541 | 4/1952 | Curtis . |
| 2,592,916 | 4/1952 | Leguillon ........................ 305/37 |
| 2,608,875 | 9/1952 | Ellison et al. . |
| 2,728,612 | 12/1955 | Howe et al. . |
| 2,732,265 | 1/1956 | Cuthbertson . |
| 2,733,965 | 2/1956 | Gladden . |
| 2,796,303 | 6/1957 | Atkinson . |
| 2,803,504 | 8/1957 | Lynch . |
| 2,823,082 | 2/1958 | Bauer, Jr. . |
| 2,845,308 | 7/1958 | Woltemar . |
| 2,900,210 | 8/1959 | Parsons . |
| 3,013,844 | 12/1961 | Mazzarins . |
| 3,019,062 | 1/1962 | Long . |
| 3,068,711 | 12/1962 | Even . |
| 3,093,006 | 6/1963 | Gamaunt . |
| 3,104,113 | 9/1963 | Montz . |
| 3,105,390 | 10/1963 | Funke et al. . |
| 3,118,709 | 1/1964 | Case . |
| 3,223,462 | 12/1965 | Dalrymple ................. 305/40 X |
| 3,232,679 | 2/1966 | Katzenberger ............. 305/40 X |
| 3,250,577 | 5/1966 | Olson . |
| 3,373,067 | 3/1968 | Hagstrom . |
| 3,439,959 | 4/1969 | Bowen et al. . |
| 3,451,728 | 6/1969 | Bruneau . |
| 3,480,339 | 11/1969 | Kell . |
| 3,567,291 | 3/1971 | Paulson . |
| 3,604,763 | 9/1971 | Maguire . |
| 3,606,497 | 9/1971 | Gilles . |
| 3,606,921 | 9/1971 | Grawey . |
| 3,618,384 | 11/1971 | Bierlein . |
| 3,625,574 | 12/1971 | Plastino . |
| 3,630,580 | 12/1971 | Grawey et al. . |
| 3,645,586 | 2/1972 | Piepho . |
| 3,703,321 | 11/1972 | Schoonover . |
| 3,734,576 | 5/1973 | Heiple et al. . |
| 3,736,032 | 5/1973 | Mosshart et al. . |
| 3,758,171 | 9/1973 | Plastino . |
| 3,771,844 | 11/1973 | Perreault . |
| 3,773,394 | 11/1973 | Grawey . |
| 3,808,901 | 5/1974 | Berg . |
| 3,857,617 | 12/1974 | Grawley . |
| 3,880,478 | 4/1975 | Baylor . |
| 3,888,132 | 6/1975 | Russ, Sr. . |
| 3,899,219 | 8/1975 | Boggs . |

(List continued on next page.)

FOREIGN PATENT DOCUMENTS

| | | |
|---|---|---|
| 8500566 | 2/1985 | European Pat. Off. .............. 305/40 |
| 473073 | 3/1929 | Fed. Rep. of Germany . |
| 533398 | 8/1931 | Fed. Rep. of Germany ...... 474/205 |
| 1149255 | 12/1960 | Fed. Rep. of Germany . |
| 1918554 | 1/1965 | Fed. Rep. of Germany . |
| 2149557 | 4/1973 | Fed. Rep. of Germany ........ 305/40 |
| 3319067 | 11/1984 | Fed. Rep. of Germany . |
| 710824 | 8/1931 | France ................. 305/41 |
| 893727 | 10/1944 | France ................. 305/41 |
| 2378669 | 8/1978 | France . |
| 2471905 | 12/1979 | France . |
| 55-55063 | 4/1980 | Japan . |
| 57-144175 | 6/1982 | Japan . |
| 85-02824 | 7/1985 | PCT Int'l Appl. . |
| 170900 | 10/1934 | Switzerland . |
| 3500200 | 12/1960 | Switzerland . |
| 223515 | 10/1924 | United Kingdom . |
| 721141 | 12/1954 | United Kingdom ................. 305/41 |
| 1604615 | 12/1981 | United Kingdom . |
| 2104015 | 3/1983 | United Kingdom . |

OTHER PUBLICATIONS

Caterpillar brochure, "CAT Caterpillar 65", Feb., 1987, 10 pages.

Fabricon 81 brochure, Vannerflex ™, "Cleated Conveyor Belting for Industry", pp. 1–17, Portland, Oreg.

*MaCarthur Press (Books) Pty. Ltd.,* "Blackwoods General Catalogue", published in Australia in 1979, p. 841.

Caterpillar, "CAT Challenger 65", Dec. 1986, (brochure).

Mike Osenga, "Caterpillar's New Rubber-Tracked Farm Tractor", Mar. 1987, pp. 25–26, from *Diesel Progress North American* (magazine).

Brendan M. Greeley, Jr., "Caterpillar, Martin Marietta Roll Out Phototype Hard Mobile ICBM Launcher", 9/16/85, pp. 24–25, Aviation Week & Space Technology.

U.S. PATENT DOCUMENTS

| | | |
|---|---|---|
| 3,899,220 | 8/1975 | Grawey et al. . |
| 3,900,231 | 8/1975 | Ohm . |
| 3,955,855 | 5/1976 | Massieon et al. . |
| 4,023,865 | 5/1977 | Morissette . |
| 4,093,318 | 6/1978 | Edwards .......................... 305/57 X |
| 4,141,600 | 2/1979 | Orpana ............................. 305/38 X |
| 4,145,092 | 3/1979 | Kasin . |
| 4,175,796 | 11/1979 | Boggs et al. . |
| 4,185,877 | 1/1980 | Tanoue et al. .................... 305/46 X |
| 4,198,103 | 4/1980 | Ward et al. ........................... 305/12 |
| 4,203,633 | 5/1980 | Hare . |
| 4,217,006 | 8/1980 | Dehnert . |
| 4,281,882 | 8/1981 | van der Lely . |
| 4,349,234 | 9/1982 | Hartmann . |
| 4,359,248 | 11/1982 | Kortering ............................. 305/46 |
| 4,362,340 | 12/1982 | van der Lely . |
| 4,365,965 | 12/1982 | Russ, Sr. . |
| 4,410,219 | 10/1983 | van der Lely . |
| 4,448,273 | 5/1984 | Barbieri . |
| 4,449,958 | 5/1984 | Conrad . |
| 4,452,496 | 6/1984 | van der Lely . |
| 4,473,366 | 9/1984 | Cataldo . |
| 4,484,903 | 11/1984 | Schneider . |
| 4,569,561 | 2/1986 | Edwards et al. . |
| 4,579,547 | 4/1986 | McComber et al. . |
| 4,594,846 | 1/1986 | Livesay et al. . |
| 4,595,387 | 6/1986 | Frazier et al. . |
| 4,611,860 | 9/1986 | Wohlford et al. . |
| 4,616,883 | 10/1986 | Edwards et al. . |
| 4,618,190 | 10/1986 | Garman et al. . |
| 4,636,014 | 1/1987 | Dennison et al. . |
| 4,637,665 | 1/1987 | Burdick et al. . |
| 4,642,080 | 2/1987 | Takano et al. . |
| 4,650,444 | 3/1987 | Sakakibara et al. . |
| 4,687,261 | 8/1987 | Atkin .................................. 305/54 X |
| 4,721,498 | 1/1988 | Grob ..................................... 474/261 |

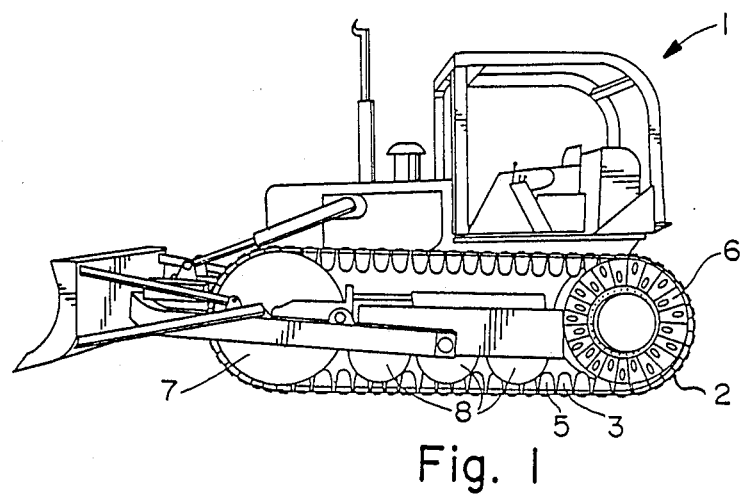
Fig. 1
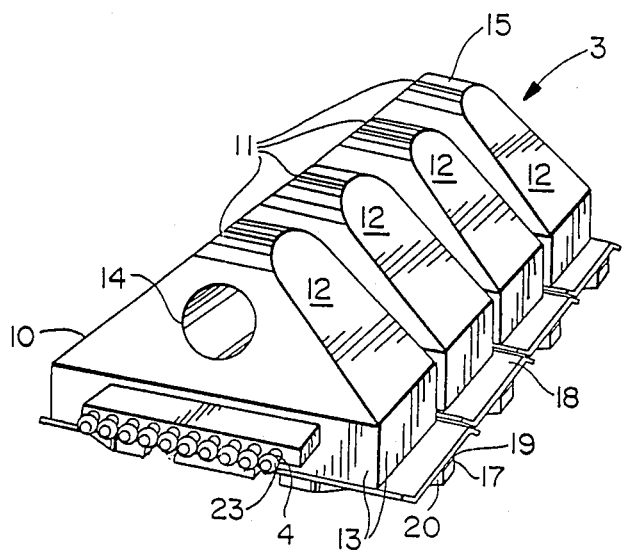
Fig. 2
Fig. 3
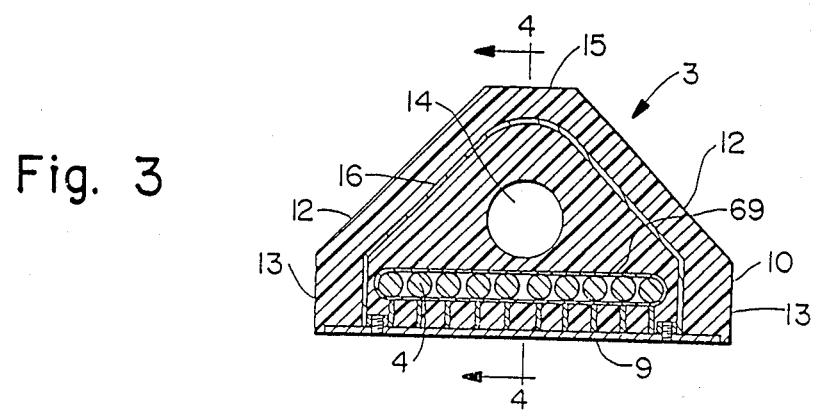

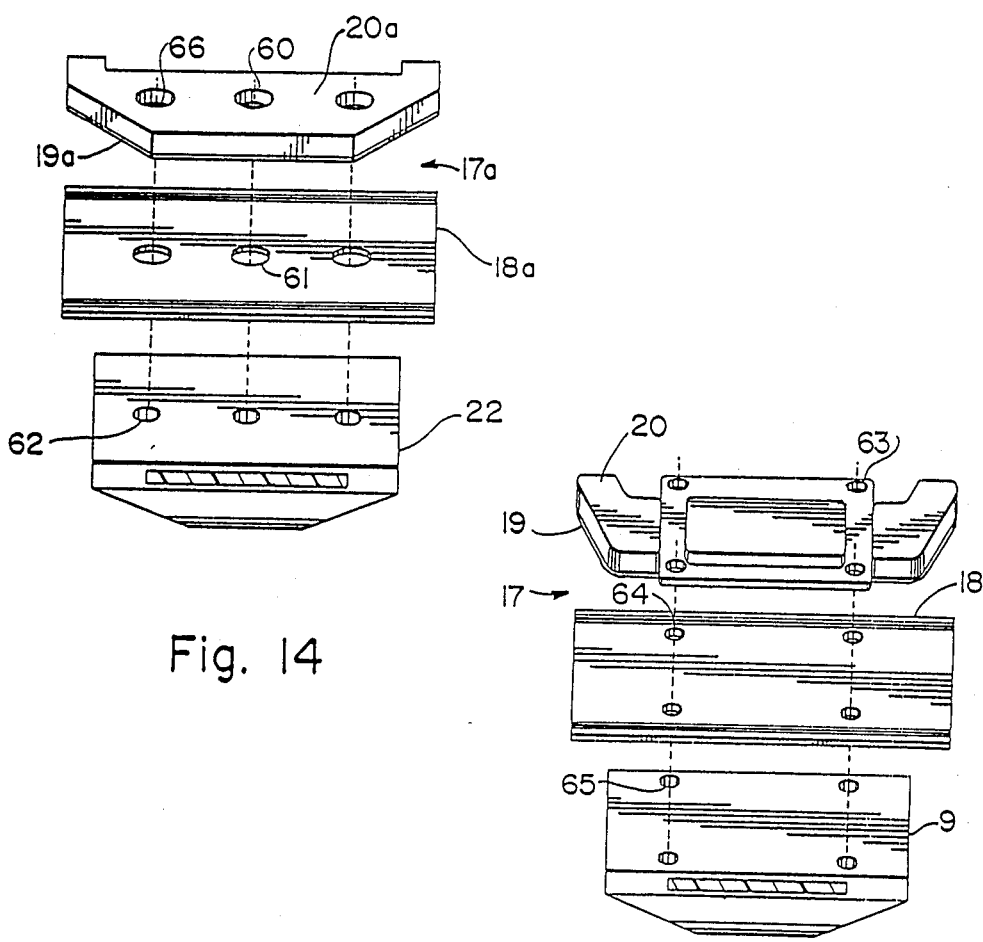
Fig. 14
Fig. 19
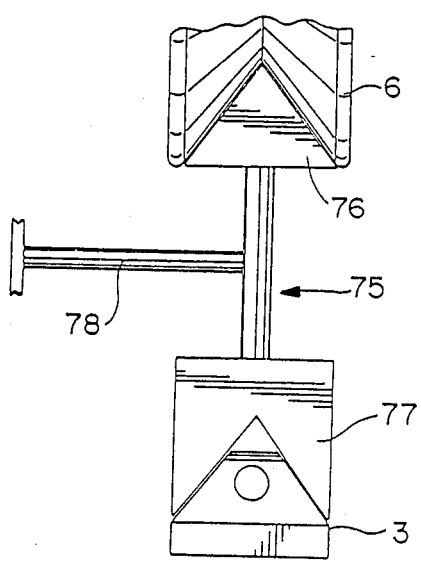
Fig. 20

MODULAR ENDLESS TRACK DRIVE SYSTEM AND METHODS OF MAKING, INSTALLING AND REPAIRING SAME

BACKGROUND OF THE INVENTION

The present invention relates to an endless track drive system, and methods of making, installing and repairing such a system. Endless track drive systems are used on vehicles such as tractors, bulldozers and tanks.

Many efforts have been made to improve endless track drive systems. In Edwards U.S. Pat. No. 4,093,318, issued June 6, 1978 (fully incorporated herein by reference), an endless track drive system is disclosed and claimed which includes a plurality of endless track drive sections, each section having a substantially flat contact surface and sloped surfaces to distribute weight and shed dirt and other foreign objects. Although U.S. Pat. No. 4,093,318 represented a marked improvement in endless track drive systems existing prior to that time, the pivotal means of connecting the endless track drive sections was subject to excessive wear, and the endless track drive system there disclosed continued to be excessively difficult and time-consuming to make, install and repair. It was further found that dirt and foreign objects continued to interfere with proper operation of the endless track drive system, although again not to the extent of track drive systems existing prior thereto.

In further recent developmental work, Edwards and his partners/co-inventors Harper and McNew have further improved upon the endless track drive system disclosed in Edwards U.S. Pat. No. 4,093,318. Their U.S. Pat. Nos. 4,569,561 issued Feb. 11, 1986, and 4,616,883 issued Oct. 14, 1986 (both fully incorporated herein by reference), disclose and claim an endless track drive system made up of a number of drive sections interconnected by cable connector sections. As there disclosed, the drive sections have sloping sides with removable rubber wear pads, and the cable connector sections include cables encased in rubber or other similar suitable material. As a result of such features, the endless track drive system disclosed and claimed therein experiences improved flexibility and tensile strength, reduced noise, and reduced maintenance. The detrimental effects of dirt and debris are likewise mitigated.

Despite the marked improvement in endless track drive systems resulting from the recent work of Edwards, Harper and McNew, as represented in U.S. Pat. Nos. 4,569,561 and 4,616,883, there remained a need for simplification in the manufacture, installation and repair of even that improved endless track drive system. Furthermore, the industry is always interested in and receptive to mitigating even further the effects of dirt and debris on endless track drive systems because of the resulting operational problems, downtime and increased maintenance.

SUMMARY OF THE INVENTION

Accordingly, the present invention has been developed to overcome the foregoing shortcomings of the prior most recent improved endless track drive system, and to provide an endless track drive system which has an improved construction, is simpler, less costly and less time-consuming to manufacture, install and repair, and which is less susceptible to interference by dirt and debris.

It is therefore an object of the present invention to provide an endless track drive system with improved construction which is more resistant to contamination by dirt, sand, gravel and other foreign objects.

It is yet another object of the present invention to provide an endless track drive system which can be efficiently and economically manufactured.

It is still a further object of the present invention to provide an endless track drive system which can be quickly and economically installed on an endless track drive vehicle.

It is even yet a further object of the present invention to provide an endless track drive system which can be quickly and economically repaired in situ on an endless track drive vehicle.

Thus, in accordance with one aspect of the present invention the shortcomings of existing endless track drive systems are overcome by an endless track drive module comprising a plurality of base portions, at least one connector member, and a polymeric structure extending from said base portions and encasing all but the ends of said at least one connector member, the polymeric structure forming a plurality of drive members equal in number to said plurality of base portions, each said drive member including at least one drive face.

In accordance with another aspect of the present invention, the connected member ends of adjacent drive modules are joined by polymeric master links to form an endless track. The master links preferably have upper and lower base portion parts for fastening connector members extending from adjacent drive modules, and drive faces configured similarly to the drive module drive faces.

In accordance with yet another aspect of the present invention, the modular endless track drive system includes a drive wheel, the drive wheel preferably having a plurality of drive surfaces shaped to substantially match the shape of drive faces of the drive module drive members and master links.

In accordance with still another aspect of the present invention, the drive wheel of the modular endless track drive system further includes a sprocket for engaging with another drive face on each of the drive module drive members and master links thereby further driving the endless track drive system.

Still further aspects of the present invention include removable tread members and means for scraping dirt and debris from the modular endless track drive system, and methods of making, installing and repairing the modular endless track drive system in accordance with specified steps.

These and other aspects and advantages of the present invention are described in or apparent from the following detailed description of the preferred embodiments.

BRIEF DESCRIPTION OF THE DRAWINGS

The preferred embodiments are described with reference to the drawings in which:

FIG. 1 is a perspective view of a bulldozer equipped with a modular endless track drive system in accordance with the present invention;

FIG. 2 is a perspective view of an endless track drive module in accordance with the present invention;

FIG. 3 is a transverse sectional view of the endless track drive module of FIG. 2 taken through one of the drive members thereof;

FIG. 14 is an exploded view of a master link base portion, removable backing plate and removable tread usable in the modular endless track drive system of the present invention;

FIG. 19 is an exploded view similar to FIG. 14 showing a drive module base portion, removable backing plate and removable tread usable in the modular endless track drive system of the present invention; and FIG. 20 is an elevational view of a scraper tool usable with the modular endless track drive system of the present invention.

DESCRIPTION OF THE PREFERRED EMBODIMENTS

Figure 4:
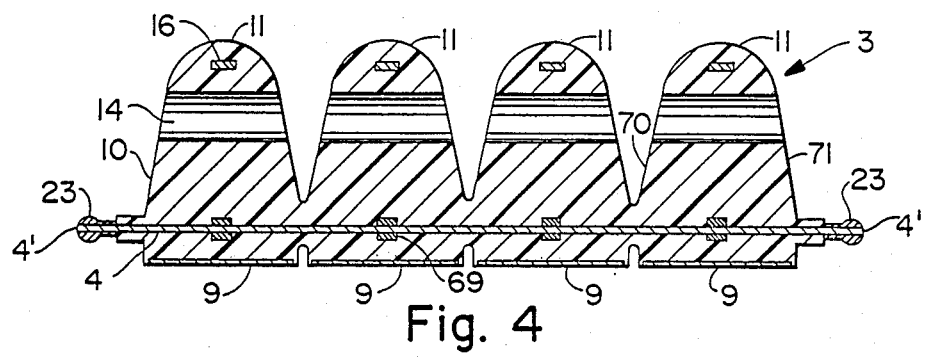
FIG. 4 is a longitudinal sectional view of the endless track drive module of FIG. 2 taken along the line 4—4 of FIG. 3.

FIG. 1 depicts a modular endless track drive system 2 of the present invention installed on a bulldozer 1. FIG. 1 depicts only one modular endless track drive system, but it will be understood that the typical track vehicle is equipped with at least two such systems.

Each modular endless track drive system 2 is made up of a plurality of endless track drive modules 3 which are linked together by connector members 4 (FIG. 2) fastened together by master links 5 in a closed loop to form an endless track. The endless track drive system further includes the necessary drive wheels 6, and any necessary supporting wheels, such as opposite end wheels 7 and idler wheels or rollers 8. The modular endless track is installed so as to pass around the wheels 6, 7 and 8. The idler wheels 8 are irregularly spaced so as not to simultaneously engage like points on the endless track, thereby preventing undue vibrations. Of course, the track vehicle is further equipped with the necessary power source and controls to power the endless track drive system 2 and thereby propel the vehicle over varying terrain as desired.

FIGS. 2–4 depict an endless track drive module 3 in accordance with the present invention. Endless track drive module 3 includes a plurality of base portions 9 on top of which is a polymeric structure 10. The base portions 9 are preferably made of steel or other metal, but may be made of some other strong, rigid material. The polymeric structure is preferably molded onto base portions 9, but may be constructed in other ways. The polymeric structure can be formed of any polymeric material which will provide a suitable frictional drive surface with limited operational noise; examples are rubber, polyurethane, or other plastics. As shown in FIGS. 2 and 4, the polymeric structure 10 is formed into a plurality of drive members 11 equal in number to the number of base portions 9. Although FIGS. 2 and 4 depict an endless track drive module with four drive members, the drive module can be formed of any number of drive members.

Encased within the polymeric structure 10 is at least one connector member 4, the connector member 4 both reinforcing the endless track drive module 3 and providing the means by which adjacent drive modules can be joined together to form an endless track. The connector members 4 are preferably steel cables, but also may be made of other materials such as nylon or other high strength light weight cord. Although ten connector members are depicted in FIG. 2, it will be appreciated that any desired number of connector members may be utilized. It will further be appreciated that the connector members 4 must be suspended above base portions 9 prior to the forming of polymeric structure 10 onto base portions 9 so that connector members 4 may be substantially encased within the polymeric structure. The ends 4' of the connector members 4 must be left exposed so as to be available for joining adjacent drive modules to form an endless track.

As depicted in FIGS. 2 and 3, each drive member 11 includes at least one drive face 12. Each drive member 11 is preferably formed with two lateral frictional drive faces 12 which slope inwardly from the respective base portion 9 toward one another to form substantially an inverted V-shaped transverse cross-section with respect to said base portion. However, drive members 11 may be provided with any suitable type, number and configuration of drive faces. For example, each drive member 11 could be provided with two lateral frictional drive faces which slope outwardly from a central portion of its respective base portion 9, thereby providing drive members 11 with concave V-shaped transverse cross-sections with respect to base portions 9. Other configurations will further be understood from the above disclosure.

Drive members 11 may also be provided with vertically extending planar portions 13 below drive faces 12 so that base portions 9 will extend beyond the radial peripheries of wheels 6 and 7 thereby raising the track vehicle 1 higher above the terrain to further protect the structural mechanisms of the track vehicle from dirt and debris. Drive members 11 also may have front and rear edges (lateral drive face side edges) 70, 71 which are inwardly sloped with respect to a longitudinal direction of the endless track drive system so that such edges will lie substantially parallel to one another as they proceed around drive wheel 6 of the track vehicle (see FIG. 9), thereby providing smoother operation, permitting use of a sprocket, and further reducing influx of detrimental dirt and debris. The gaps between adjacent drive members and master links resulting from sloped edges 70 and 71 further permit dirt and debris to escape along straight runs of the endless track.

To reduce the mass of drive modules 3, and also reduce consumption of polymeric material and consequent cost, one or more holes 14 optionally may be formed in each drive member. Furthermore, an additional upper drive surface 15 may be formed on each drive member for either frictional drive or sprocket drive by an axle of drive wheel 6 to be described below. Additionally, a support structure 16 may be fastened to each base portion 9 by welding, screws, bolts or other fastening means in order to further reinforce drive members 11, render it easier to mold polymeric structure 10 onto base portions 9, and further secure base portions 9 to polymeric structure 10. An additional support structure 69 may also be provided for suspending cables 4 above base portions 9 and further securing base portions 9 to polymeric structure 10. Support structures 16 and 69 may be in the form of metal straps, or may be made from a rigid plastic material or other suitable rigid substance. Support structure 16 is preferably shaped to conform with the desired configuration of drive faces 12, but may be shaped in other configurations to serve its intended purposes. Support structure 69 likewise may be configured in a number of ways other than as shown.

FIGS. 5A-8 depict various embodiments of the master link which is used to join adjacent drive modules in order to form the endless track. As depicted in FIGS. 5A-7A, master link 5 preferably has the same general configuration and construction as each individual drive member 11 of drive module 3, and like elements are identified with like reference numerals. However, the base portion of master link 5 has upper and lower parts 21, 22 which can be fastened together with a threaded bolt or other appropriate fastening means with connector members 4 sandwiched therebetween, thereby joining adjacent drive modules. FIG. 7A depicts master link 5 fastened in place joining two adjacent drive modules 3.

Figure 5A:
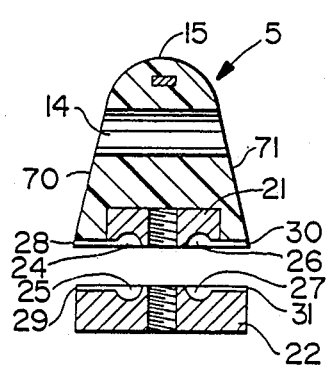
FIG. 5A is a longitudinal sectional view of a master link in accordance with the present invention.
Figure 5B:
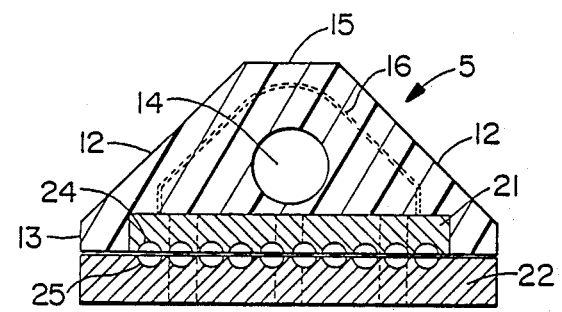
FIG. 5B is a transverse sectional view of the master link of FIG. 5A.
Figure 6:
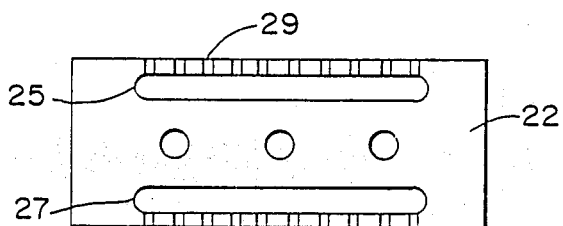
FIG. 6 is a plan view of the lower base portion part of the master link of FIG. 5A.

Preferably the ends 4' of connector members 4 are provided with retaining members 23 which are crimped onto or otherwise fastened to connector member ends 4'. The upper and lower parts 21, 22 of the base portion of the master link 5 are in this case provided with cooperating recesses 24-27 and channels 28-31 which together are of the same general configuration as cable ends 4' with retaining members 23. Each cable end 4' and retaining member 23 can be provided with their own individual recess and channel as shown in FIG. 5B, or upper and lower base portion parts 21, 22 can be provided with single recesses 24-27 and multiple channels 28-31 as shown in FIG. 6. In either case, recesses 24-27 and channels 28-31 must be sufficient to accommodate the connector members of adjacent drive modules. Although retaining members 23 and recesses 24-27 are depicted in the drawings as being generally spherical, it will be appreciated that other configurations are possible consistent with the above disclosure.

Figure 7A:
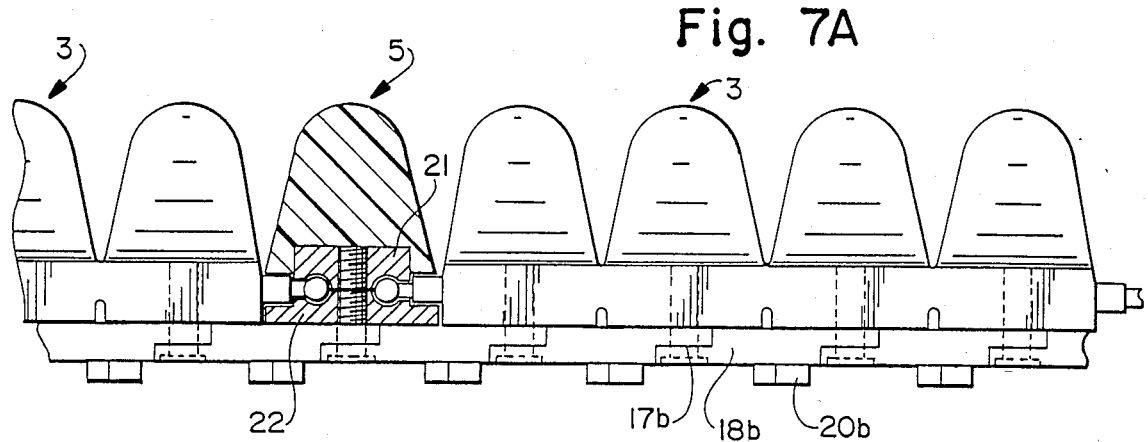
FIG. 7A is a longitudinal sectional view of the master link of FIG. 5A linking two adjacent drive modules equipped with removable tread members.
Figure 7B:
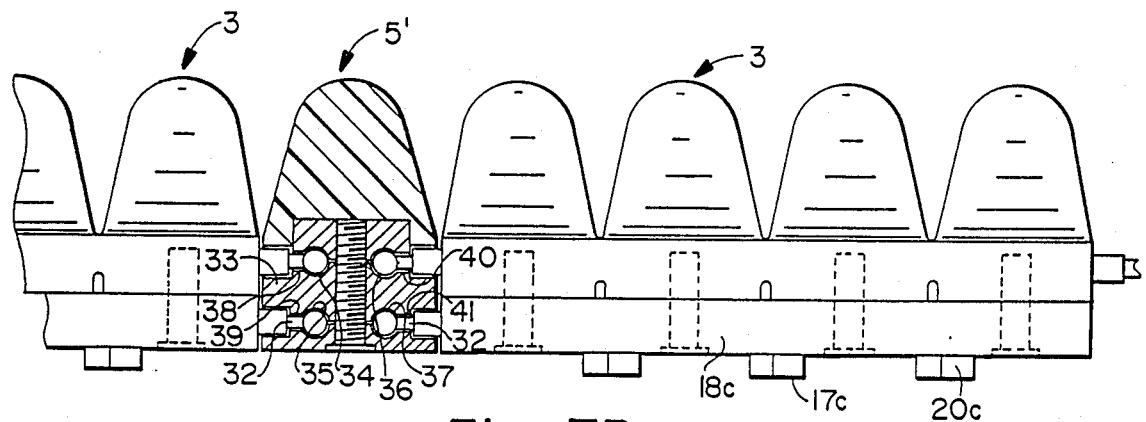
FIG. 7B is a longitudinal sectional view of a master link in accordance with another embodiment of the present invention linking two adjacent drive modules and two adjacent modular, cable reinforced removable tread members.
Figure 16:
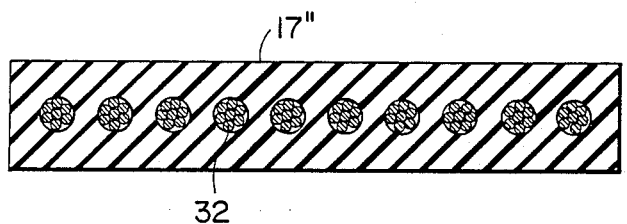
FIG. 16 is a sectional view of the cable reinforced removable tread member of FIG. 7B.

FIG. 7B depicts another master link 5' which is adapted to accommodate additional connector members 32. These additional connector members are utilized to reinforce backing plates 18c of removable tread members 17c (see also FIG. 16) and to join adjacent removable tread members 17c. Master link 5' has the same general configuration and construction as master link 5, but includes an intermediate base portion part 33. Intermediate part 33 contains additional recesses 34-37 and channels 38-41 corresponding respectively to recesses 24-27 and channels 28-31 of upper and lower base portion parts 21 and 22. Accordingly, intermediate part 33 has sufficient recesses and channels to accommodate four rows of connector members, two rows of connector members from one drive module and its removable tread member and two rows from an adjacent drive module and its removable tread member.

Figure 8:
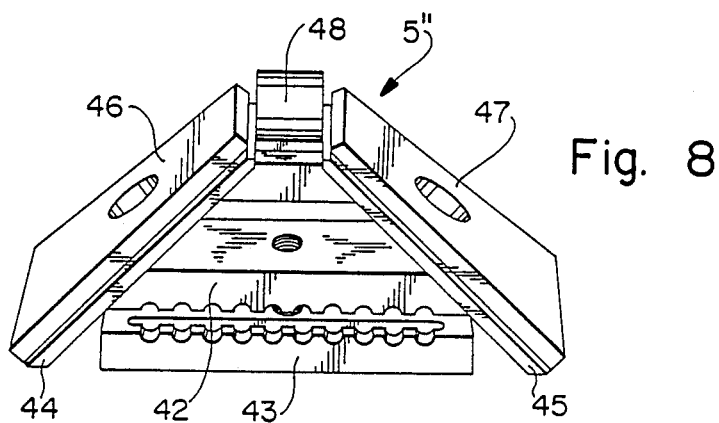
FIG. 8 is a perspective view of a master link in accordance with yet a further embodiment of the present invention.

FIG. 8 depicts yet another master link 5" which is different in construction from master link 5. Master link 5" has upper and lower base portion parts 42, 43 which correspond to upper and lower base portion parts 21, 22 of master link 5, with like recesses and channels to accommodate connector members and retaining members from adjacent drive modules. Of course, master link 5" could also be provided with an intermediate base portion part as depicted in FIG. 7B so as to be able to accommodate additional connector members and retaining members from adjacent removable tread members. Master link drive member 5" further includes side walls 44, 45 with similar slope and configuration to drive faces 12 of drive members 11, and removable polymeric drive faces 46, 47 are fastened thereto with countersunk bolts, locator pins and holes, or other known fastening means. An upper drive face 48 is provided corresponding to drive faces 15 of drive members 11 for frictional or sprocket drive to be described below. Drive faces 46, 47 may be rounded at the top to meet drive face 48 or eliminate the need for drive face 48 altogether, thereby taking on a configuration similar to master links 5 and 5'.

Figure 15:
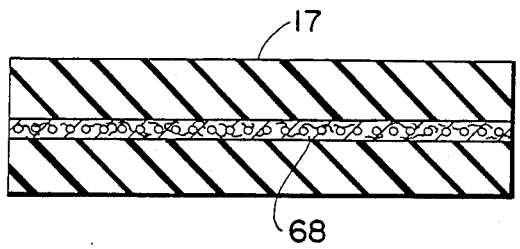
FIG. 15 is a sectional view of a bias-ply, fiber reinforced removable tread member usable in the endless track drive system of the present invention.
Figure 17:
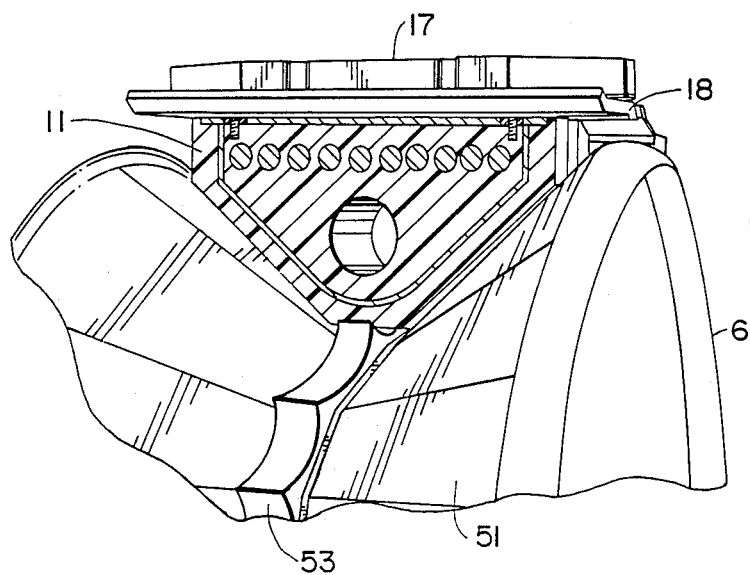
FIG. 17 is a perspective view, partially in cross-section, depicting the endless track drive module of FIG. 2 in position on the drive wheel of FIGS. 9-11.

As depicted in FIGS. 2, 17 and 19, endless track drive module 3 also preferably includes removable tread members 17, each including a metal backing plate 18 and a rubber tread 20 bonded to a metal supporting plate 19. Rubber tread 20 may include a bias-ply, fiber reinforced layer 68 as shown in FIG. 15. Individual treads and backing plates each preferably have four unthreaded holes 63 and 64, respectively, and are removably fastened to each of the base portions 9 of drive module 3 with suitable bolts or other fastening means received in threaded holes 65 of the base portions.

Master links 5 and 5" also preferably are equipped with removable tread members of slightly different configuration. As shown in FIG. 14, each master link tread member 17a includes a metal backing plate 18a and a rubber tread 20a bonded to metal supporting plate 19a, each preferably having three unthreaded holes 61, 60 and 66, respectively. The metal supporting plate 19a includes two outer holes 66 which are smaller than and concentric with the outer holes 60 in rubber tread 20a, such that the tread and backing plate can be removably fastened to lower master link base portion part 22 with suitable bolts or other fastening means received in two outer threaded holes 62 of the lower base portion part. The center holes of tread 20a, supporting plate 19a and backing plate 18a are all large enough that a suitable bolt or other fastening means can be passed therethrough and received in the center threaded hole 62 of lower master link base portion part 22. In this way, tread member 17a can be removed from the master link without completely disconnecting the upper and lower base portion parts of the master link.

FIG. 7A depicts another type of removable rubber tread member 17b, including a rubber tread 20b molded with a rubber backing plate 18b. Backing plate 18b dovetails with adjacent tread member backing plates, the ends of adjacent tread member backing plates being fastenable together with bolts or other fastening means into the base portion of a given drive member 11. Backing plates 18b and treads 20b can be bias-ply, fiber reinforced as described above relative to rubber treads 20 and as shown in FIG. 15.

Figure 18:
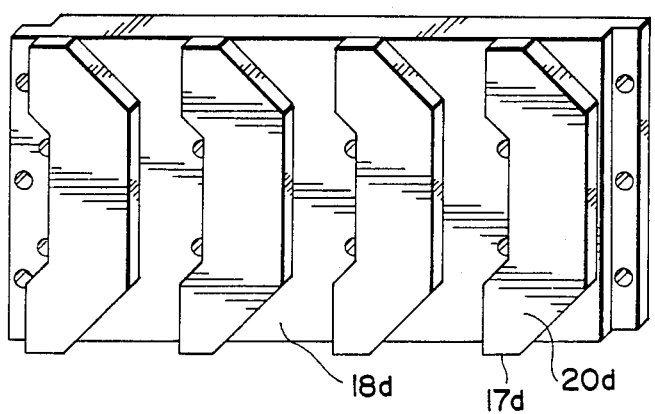
FIG. 18 is a perspective view of a modular removable tread member for use with the endless track drive system of the present invention.

FIG. 7B depicts another removable tread member 17c, including a rubber tread 20c molded with a rubber backing plate 18c which is cable reinforced (see also FIG. 16) and equal in length to the length of a given drive module. FIG. 18 depicts yet still another removable rubber tread member 17d with a rubber tread 20d and a dovetailed rubber backing plate 18d similar to FIG. 7A, but having substantially the same length as a given drive module. Of course, metal treads could also be utilized, or metal backing plates could be provided with metal grouser bars. The type of tread and backing plate to be utilized, and the material of the chosen tread and backing plate, whether rubber, metal or other material, are functions of the type of terrain over which the endless track drive vehicle is to be utilized, and are left to operator discretion.

Figure 10:
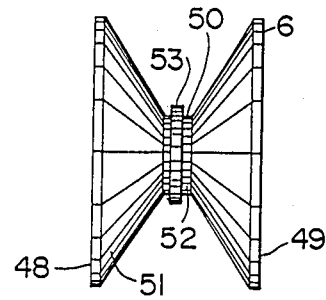
FIG. 10 is a side view of the drive wheel and sprocket of FIG. 9.
Figure 11:
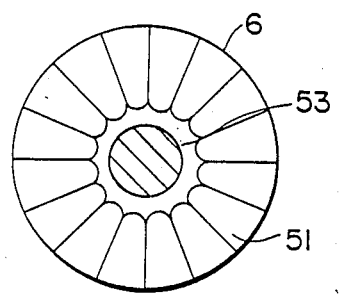
FIG. 11 is a further sectional view of the drive wheel and sprocket of FIG. 9 taken through the drive wheel axle.
Figure 12:
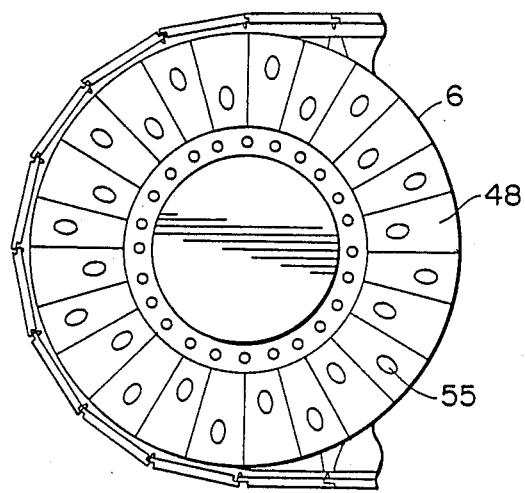
FIG. 12 is an elevational view of a drive wheel in accordance with yet a further embodiment of the present invention incorporating debris escape holes.

FIGS. 10 and 11 depict a drive wheel 6 suitable for use in the endless track drive system in accordance with the present invention. Drive wheel 6 includes first and second side portions 48, 49 connected together by axle portion 50. Each side portion 48, 49 preferably includes interior drive surfaces 51 sloped and shaped to substantially match the angle and shape of drive faces 12 of drive members 11 and master link 5, 5' (drive faces 46, 47 of master link 5'') for engagement therewith. Axle 50 further preferably includes drive surfaces 52, the number, shape and size of which are determined by the configuration of drive members 11 and master links 5, 5' and 5'', and specifically respective drive faces 15 and 48 thereof which may engage with drive surfaces 52. Although the interior of drive wheel 6 preferably includes drive surfaces 51, 52 as discussed above, axle 50 may be deleted altogether, side portions 48 and 49 then being directly connected to one another, and drive surfaces 51, 52 may also be eliminated. Furthermore, wheels 7 and 8 of track vehicle 1 may or may not contain interior drive surfaces corresponding to drive surfaces 51 and 52 of drive wheel 6. Drive wheel 6 may also contain holes 55 as shown in FIG. 12 to permit escape of dirt and debris.

Figure 9:
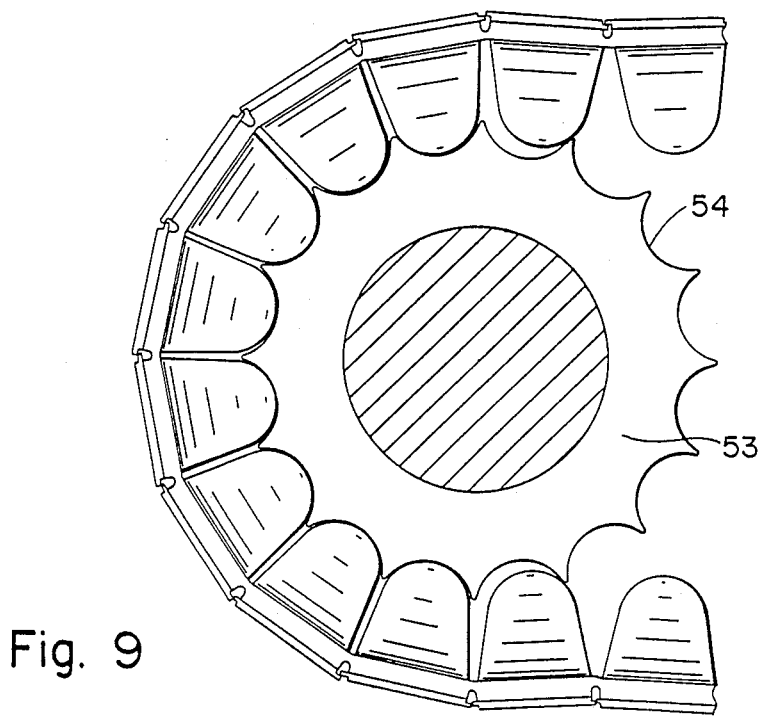
FIG. 9 is a sectional view taken through an axle of a drive wheel in accordance with an embodiment of the present invention depicting the modular endless track drive system incorporating a sprocket.

As depicted in FIGS. 9 and 11, drive wheel 6 may also include a sprocket 53 for further driving the modular endless track drive system. Sprocket 53 includes concave drive surfaces 54 which are configured for engagement with drive surface 15 of drive members 11 and master links 5 and 5', and drive surface 48 of master link 5''. FIG. 17 depicts a drive member 11 of drive module 3 engaging with interior drive surfaces 51 and sprocket 53 of drive wheel 6. Of course, the sprocket may take other forms. For example, rounded bars may be added between drive surfaces 51 of drive wheel side portions 48, 49 to interfit between adjacent drive members and master links to provide positive engagement therewith. By way of yet a further example, drive pins may be provided extending from the tops of the drive members and master links for positive engagement with spaced recesses in the drive wheel axle. Other possible sprocket arrangements will be appreciated from the above disclosure.

As depicted in FIG. 20, the modular endless track drive system may also be provided with a scraper or sweeper 75 for removing dirt and debris from drive wheel 6 and the various drive faces on the drive modules and master links of the endless track. For example, scraper 75 may include an upwardly directed convex, inverted V-shaped scraper blade 76 and a downwardly directed concave, inverted V-shaped scraper blade 77 supported by a bracket 78 affixed on a supporting surface of the endless track drive vehicle. Thus, scraper 75 can be located so as to clean the drive wheel and endless track simultaneously, thereby preventing dirt and debris from interfering with the operation of the endless track drive system. With the structure shown in FIG. 20, any dirt scraped from drive wheel 6 will fall and be diverted by scraper blade 77 instead of becoming entrapped in the endless track. Of course, scraper 75 may be located at various positions on the endless track drive vehicle, may be provided with scraper blade 76 or 77 alone, and may be of a configuration other than as shown. Additionally, bristles, brushes or other cleaning instruments may be utilized in lieu of scraper blades 76 and 77.

The above-described modular endless track drive system is easy and cost-effective to make, install and repair. The base portion 9 of drive modules 3 can be forged, cast or otherwise manufactured to the desired size, and support structures 16 and 69 can be affixed thereto by conventional means. Connector members 4 can then be suspended above a desired plurality of base portions 9, and a suitable polymeric material molded or otherwise applied onto the base portions to encase the connector members and provide a plurality of drive members of desired configuration. The recesses and channels in the upper, lower and intermediate base portion parts of master links 5, 5', 5'' easily can be machined or formed during casting of the master link base portion, and the upper, lower and intermediate parts can be appropriately threaded for receipt of conventional fasteners. The alternative master link 5'', drive wheel 6, and sprocket 53 likewise easily can be manufactured through the use of known manufacturing techniques based upon the above disclosure of those features of the present invention.

A necessary plurality of drive modules and master links can then be assembled and laid out on the ground in a linear fashion leaving two disconnected drive module ends, the endless track drive vehicle can be positioned over the modular track, and the modular track then easily can be placed around the drive wheel and supporting wheels of the vehicle and the final master link fastened in place to connect the last two drive modules and form the endless track. If one or more drive modules 3 and/or master links 5, 5', 5'' are broken during operation of the endless track drive vehicle, the modular endless track drive system easily can be repaired by removing and replacing in situ only those drive modules and master links necessary to the repair.

In accordance with the above, an improved modular endless track drive system is provided which can be constructed, installed and repaired quickly, easily and cost-effectively, and which provides excellent operability.

Figure 13A:
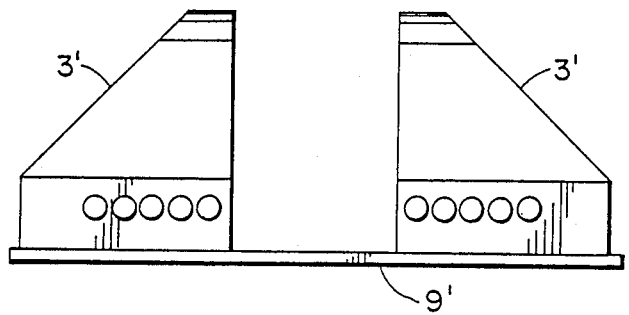
FIG. 13A is an elevational view of an endless track drive module in accordance with yet a further embodiment of the present invention.
Figure 13B:
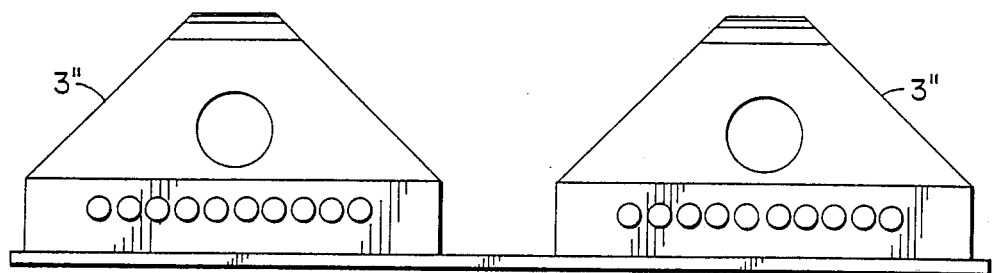
FIG. 13B is an elevational view of an endless track drive module in accordance with still a further embodiment of the present invention.

Obviously, many modifications and variations to the disclosed modular endless track drive system and methods of making, installing and repairing same are possible in light of the above teachings. For example, wider base portions 9', 9" can be provided as depicted in FIGS. 13A and 13B to provide for vehicles requiring wider modular endless tracks. In such cases, the polymeric endless track drive modules can each be molded in the form of half modules 3' or double modules 3". Drive modules 3' can be driven by a wider drive wheel or two properly spaced pneumatic driving tires. Drive modules 3" can be driven by two properly spaced drive wheels or four properly spaced pneumatic drive tires. Of course, the described master links, removable tread members and scraper would have to be reconfigured accordingly to coordinate with drive modules 3' and 3". It is to be further understood that, within the scope of the appended claims, the invention also may be practiced otherwise then as specifically described. For example, the various aspects of the invention may be selected for combination in a number of permutations other than those shown and described.

Thus, while only certain embodiments of the invention have been specifically described herein, it will be apparent that numerous modifications may be made thereto without departing from the spirit and scope of the invention.

What is claimed is:

1. An endless track drive module comprising:
   at least one connector member; and
   a polymeric structure encasing all but ends of said at least one connector member;
   said polymeric structure forming a plurality of endless track drive members, each said drive member including at least one drive face, and said ends of said connector member respectively extending from opposite longitudinal ends of said drive module.

2. The endless track drive module of claim 1, each said drive member including at least two inwardly sloping lateral frictional drive faces which form substantially an inverted V-shaped cross-section.

3. The endless track drive module of claim 2, each said drive member further including an upper drive face between said at least two inwardly sloping lateral frictional drive faces.

4. The endless track drive module of claim 1, said at least one connector member comprising a cable with ends that respectively extend from opposite longitudinal ends of said drive module.

5. The endless track drive module of claim 4, comprising a plurality of cables substantially encased within said polymeric structure, ends of each cable respectively extending from opposite longitudinal ends of said endless track drive module.

6. The endless track drive module of claim 1, said polymeric structure comprising a molded structure.

7. The endless track drive module of claim 1, each said drive member having a hole longitudinally therethrough to reduce the polymeric mass of said drive member.

8. The endless track drive module of claim 1, each said drive member including at least one lateral frictional drive face and an upper drive face, said upper drive face being narrower at an uppermost point than at a lowermost point as viewed from a transverse perspective of said drive module.

9. The endless track drive module of claim 2, said lateral frictional drive faces sloping inwardly in a transverse direction with respect to said endless track drive system, and side edges of said drive faces sloping inwardly with respect to a longitudinal direction of said endless track drive system.

10. An endless track drive module comprising:
    a plurality of base portions;
    at least one cable; and
    a polymeric structure extending from said base portions and encasing all but ends of each said cable;
    said polymeric structure forming a plurality of endless track drive members equal in number to said plurality of base portions, each said drive member including at least two inwardly sloping lateral frictional drive faces which form substantially an inverted V-shaped cross-section with respect to a corresponding base portion, and further wherein said ends of each said cable respectively extend from opposite longitudinal ends of said drive module.

11. An endless track drive module comprising:
    a plurality of base portions;
    support structure extending from each said base portion;
    at least one connector member; and
    a polymeric structure extending from said base portions and encasing said support structure and all but ends of said at least one connector member;
    said polymeric structure forming a plurality of drive members equal in number to said plurality of base portions, each said drive member including at least one drive face, and said ends of said connector member respectively extending from opposite ends of said drive module.

12. The endless track drive module of claim 11, said support structure comprising a strap with two inwardly sloping lateral side wall portions which form substantially an inverted V-shaped cross-section with respect to a corresponding base portion.

13. The endless track drive module of claim 11, said support structure further comprising a strap fixing said at least one connector member to each of said base portions.

14. The endless track drive module of claim 11, each said drive member including at least two inwardly sloping lateral frictional drive faces which form substantially an inverted V-shaped cross-section with respect to a corresponding base portion.

15. The endless track drive module of claim 14, each said drive member further including an upper drive face between said at least two inwardly sloping lateral frictional drive faces.

16. An endless track drive module comprising:
    a plurality of base portions;
    at least one connector member;
    a first strap extending from each said base portion, said strap including two inwardly sloping lateral side wall portions which form substantially an inverted V-shaped cross-section with respect to a corresponding base portion;

a second strap extending from each said base portion and fixing said at least one connector member to each said base portion; and a polymeric structure extending from said base portions and encasing said straps and all but ends of said at least one connector member;

said polymeric structure forming a plurality of drive members equal in number to said plurality of base portions, each said drive member including at least two inwardly sloping lateral frictional drive faces which form substantially an inverted V-shaped cross-section with respect to a corresponding base portion, and said ends of said connector member respectively extending from opposite longitudinal ends of said drive module.

17. An endless track drive module comprising:
a plurality of base portions;
at least two connector members; and
a polymeric structure extending from said base portions and encasing all but ends of said at least two connector members;
said polymeric structure forming a plurality of drive members at least twice in number to said plurality of base portions, each base portion supporting at least two drive members and each drive member including at least one inwardly sloping lateral frictional drive face; and
each said drive member encasing part of at least one of said connector members, and the ends of each connector member respectively extending from opposite longitudinal ends of said drive module.

18. An endless track drive module comprising:
a plurality of base portions;
at least two connector members; and
a polymeric structure extending from said base portions and encasing all but ends of said at least two connector members;
said polymeric structure forming a plurality of drive members at least twice in number to said plurality of base portions, each base portion supporting at least two drive members and each drive member including at least two lateral frictional drive faces, one inwardly sloping and one outwardly sloping; and
each said drive member encasing part of at least one of said connector members, and the ends of each connector member respectively extending from opposite longitudinal ends of said drive module.

19. A modular endless track drive system comprising:
at least one polymeric drive module, each drive module including a polymeric structure encasing all but ends of at least one connector member whose ends respectively extend from opposite longitudinal ends of said drive module, and forming a plurality of endless track drive members, each said drive member including at least one drive face; and
at least one master link for joining the extending drive module connector member ends to form an endless track.

20. The modular endless track drive system of claim 19, comprising a plurality of drive modules and master links, each said master link including a base portion with upper and lower parts, the extending ends of connector members of adjacent drive modules being fastened between said upper and lower base portion parts.

21. The modular endless track drive system of claim 20, the extending ends of connector members including retaining members, and the upper and lower base portion parts of each master link including cooperating recesses for receiving the retaining members of connector members of adjacent drive modules and thereby fastening the extending connector member ends of adjacent drive modules between said upper and lower base portion parts.

22. The modular endless track drive system of claim 21, each drive module including a plurality of connector members comprising a plurality of cables with retaining members on ends thereof, and the recesses of each master link being capable of receiving the retaining members of all connector members of adjacent drive modules.

23. The modular endless track drive system of claim 19, further comprising a plurality of base portions from which said polymeric structure extends, and removable tread members fastened to said base portions on sides thereof opposite from the sides supporting said drive members.

24. The modular endless track drive system of claim 23, a separate removable tread member being fastened to each base portion.

25. The endless track drive system of claim 23, said removable tread members comprising a plurality of dovetailed removable tread members, overlapping ends of said tread members being together fastened to a corresponding base portion.

26. The modular endless track drive system of claim 23, said removable tread members being bias-ply, fiber reinforced.

27. The modular endless track drive system of claim 23, each removable tread member being of substantially equivalent length to the length of a drive module, and being fastened to one or more of the base portions of a corresponding drive module.

28. The modular endless track drive system of claim 27, overlapping ends of said removable tread members being together fastened to a corresponding base portion.

29. The modular endless track drive system of claim 27, each removable tread member encasing at least one cable whose ends respectively extend from opposite ends thereof, and the base portion of each master link including upper, lower and intermediate parts, cable ends extending from adjacent drive modules being fastened between the upper and intermediate parts and the cable ends extending from adjacent removable tread members being fastened between the intermediate and lower parts.

30. The modular endless track drive system of claim 19, each said master link being of a configuration substantially matching the configuration of the drive members of said drive modules.

31. The modular endless track drive system of claim 30, each said drive module drive member including at least two inwardly sloping lateral frictional drive faces, and each master link comprising a base portion, at least two supporting lateral walls sloping inwardly from said base portion, and at least two polymeric wear pads supported by said supporting walls and forming at least two inwardly sloping lateral frictional drive faces.

32. The modular endless track drive system of claim 19, each said drive module drive member and master link being a molded polymeric structure with at least two inwardly sloping lateral frictional drive faces.

33. The modular endless track drive system of claim 19, further comprising at least one tread member removably fastened to said endless drive track and extending in a direction opposite from said drive members, said at least one removable tread member comprising a polymeric tread bonded to a metal supporting plate which is fastened to said endless drive track with a metal backing plate sandwiched therebetween.

34. The modular endless track drive system of claim 33, said polymeric tread comprising three tread portions bonded to said metal supporting plate in a transverse direction of said endless track, with spaces between adjacent tread portions to allow escape of dirt and debris.

35. The modular endless track drive system of claim 34, said at least one removable tread member being substantially U-shaped in plan view.

36. The modular endless track drive system of claim 34, at least one tread member being removably fastened to said master link, said master link removable tread member comprising a polymeric tread bonded to a metal supporting plate which is fastened to said master link with a metal backing plate sandwiched therebetween.

37. A modular endless track drive system comprising:
a plurality of polymeric drive modules, each drive module including a polymeric structure extending from a plurality of base portions, encasing all but ends of at least one connector member whose ends respectively extend from opposite longitudinal ends of said drive module, and forming a plurality of endless track drive members equal in number to said plurality of base portions, each said drive member including at least one drive face;
a like plurality of polymeric master links for joining the extending ends of connector members of adjacent drive modules to form an endless track; and
a drive wheel for driving said endless track, said drive wheel including at least one drive surface for engaging with said at least one drive face of each of said drive member.

38. The modular endless track drive system of claim 37, each said drive member including at least two lateral frictional drive faces, and said drive wheel including a plurality of drive surfaces, each said drive surface being shaped to substantially match the shape of a lateral frictional drive face of said drive members for frictional engagement therewith.

39. The modular endless track drive system of claim 38, said drive wheel including first and second side portions and an axle portion connecting said first and second side portions, and said axle portion of said drive wheel including a plurality of drive surfaces for engagement with an upper frictional drive face on each drive member between said at least two lateral frictional drive faces.

40. The modular endless track drive system of claim 39, said drive wheel drive surfaces further engaging with lateral and upper frictional drive faces on each master link.

41. The modular endless track drive system of claim 38, said drive wheel further comprising sprocket means for further driving said drive members.

42. The modular endless track drive system of claim 41, said drive wheel including first and second side portions and an axle portion connecting said first and second side portions, and said axle portion of said drive wheel including a sprocket shaped to substantially match and engage with an upper drive face on each drive member between said at least two lateral frictional drive faces.

43. The modular endless track drive system of claim 42, said drive wheel drive surfaces and sprocket further respectively engaging with lateral and upper drive faces on each master link.

44. The modular endless track drive system of claim 37, said drive wheel including a plurality of holes for escape of debris.

45. A modular endless track drive system comprising:
a plurality of polymeric drive modules, each said drive module including a polymeric structure extending from a plurality of base portions, encasing all but ends of at least one connector member whose ends respectively extend from opposite longitudinal ends of said drive module, and forming a plurality of endless track drive members equal in number to said plurality of base portions, each said drive member including at least two inwardly sloping lateral frictional drive faces;
a like plurality of polymeric master links, each said master link including a base portion with upper and lower parts for fastening therebetween the extending ends of connector members of adjacent drive modules to form an endless track; and
a drive wheel for driving said endless track, said drive wheel including a plurality of drive surfaces, said drive surfaces being shaped to substantially match the shape of said lateral frictional drive faces of said drive members for engagement therewith.

46. The modular endless track drive system of claim 45, said scraper means for simultaneously scraping dirt and debris from said drive wheel and said endless track.

47. A modular endless track drive system comprising:
a plurality of polymeric drive modules, each said drive module including a polymeric structure extending from a plurality of base portions, encasing all but ends of at least one connector member whose ends respectively extend from opposite longitudinal ends of said drive module, and forming a plurality of endless track drive members equal in number to said plurality of base portions;
a like plurality of polymeric master links, each said master link including a base portion with upper and lower parts for fastening therebetween the extending ends of connector members of adjacent drive modules to form an endless track; and
a drive wheel for driving said endless track;
each of said drive member and master link including at least two lateral frictional drive faces sloping inwardly toward one another from a corresponding base portion in a transverse direction with respect to said endless track drive system, each of said drive faces having at least two side edges sloping inwardly toward one another from said corresponding base portion with respect to a longitudinal direction of said endless track drive system so that the side edges of drive faces of drive members and master links which are in contact with the drive wheel are substantially parallel to the side edges of drive faces of adjacent drive members and master links thereby minimizing any gaps therebetween, and said drive wheel including at least two drive surfaces for engaging with said at least two lateral frictional drive faces of said drive members and master links for frictional engagement therewith.

48. A modular endless track drive system comprising:
at least one polymeric drive module, each drive module including a polymeric structure with at least one frictional drive face, said polymeric structure encasing all but ends of at least one connector member whose ends extend from opposite longitudinal ends of said drive module; and at least one master link for joining the extending drive module connector member ends to form an endless track.

49. The modular endless track drive system of claim 48, said master link being formed of a polymeric material.

50. The modular endless track drive system of claim 48, said at least one frictional drive face comprising a lateral frictional drive face.

51. The modular endless track drive system of claim 48, said polymeric structure having at least two inwardly sloping lateral frictional drive faces which form substantially an inverted V-shaped cross-section.

52. A modular endless track drive system comprising:
at least one polymeric drive module, each drive module including a polymeric structure encasing all but ends of at least one connector member whose ends respectively extend from opposite longitudinal ends of said drive module, said polymeric structure forming a plurality of endless track drive members, each said drive member including at least one lateral frictional drive face; and at least one polymeric master link for joining the extending drive module connector member ends to form an endless track.

53. The modular endless track drive system of claim 19, each said drive member including at least one lateral frictional drive face and an upper drive face, said upper drive face being narrower at an uppermost point than at a lowermost point as viewed from a transverse perspective of said drive module.

54. The modular endless track drive system of claim 53, said master link having at least one lateral frictional drive face and an upper drive face of like configuration to the at least one lateral frictional drive face and upper drive face of said at least one drive module.

55. The modular endless track drive system of claim 37, further comprising scraper means for scraping dirt and debris from said endless track drive system.

* * * * *

UNITED STATES PATENT AND TRADEMARK OFFICE
CERTIFICATE OF CORRECTION

PATENT NO.    :    4,861,120
DATED         :    August 29, 1989
INVENTOR(S)   :    John W. EDWARDS et al It is certified that error appears in the above-identified patent and that said Letters Patent is hereby corrected as shown below:

Col. 10, claim 11, line 13, after "opposite" insert --longitudinal--.

Signed and Sealed this

Seventeenth Day of September, 1991

*Attest:*

HARRY F. MANBECK, JR.

*Attesting Officer*    *Commissioner of Patents and Trademarks*